United States Patent [19]

F'Geppert

[11] 4,131,256

[45] Dec. 26, 1978

[54] ENGINE MOUNT

[75] Inventor: Erwin F'Geppert, Novi, Mich.

[73] Assignee: The United States of America as represented by the Secretary of the Army, Washington, D.C.

[21] Appl. No.: 819,309

[22] Filed: Jul. 27, 1977

[51] Int. Cl.$^2$ .............................................. B60K 1/00
[52] U.S. Cl. .................................... 248/3; 105/464; 248/25; 248/316 A; 248/503; 269/242; 403/90
[58] Field of Search .............. 248/2, 3, 25, 154, 226.1, 248/226.3, 316 A, 316 C, 500, 503, 506; 269/242; 403/90, 142; 180/64 R; 105/463, 464, 475

[56] References Cited

U.S. PATENT DOCUMENTS

| 1,609,939 | 12/1926 | Gehrung | 248/3 |
| 2,699,708 | 1/1955 | Fotsch | 269/242 X |
| 3,127,139 | 3/1964 | Bittle | 248/25 X |
| 3,861,664 | 1/1975 | Durkee | 269/242 X |

FOREIGN PATENT DOCUMENTS

| 365861 | 10/1921 | Fed. Rep. of Germany | 248/25 |
| 433394 | 9/1926 | Fed. Rep. of Germany | 180/64 R |

Primary Examiner—Lawrence J. Staab
Attorney, Agent, or Firm—Peter A. Taucher; John E. McRae; Nathan Edelberg

[57] ABSTRACT

An engine mount wherein the engine carries two oppositely-moving jaws adapted to clamp against opposite side surfaces of a hold-down element carried by the vehicle. The jaws are actuated for opening or closing movements by means of a single screw extending through both jaws. The screw threads engaged with one jaw are right-handed, and the screw threads engaged with the other jaw are left-handed, for producing the desired jaw motions. The jaws and actuator screw are freely adjustable as a unit whereby the jaws apply equal pressures on the hold-down element.

3 Claims, 8 Drawing Figures

ENGINE MOUNT

BACKGROUND AND SUMMARY OF THE INVENTION

Under conventional practice engines are supported in vehicles by three or four engine mounts engaged between the vehicle and spaced portions of the engine. Each engine mount usually comprises an engine-attached rail or plate and a resilient cushion or pad carried by the vehicle. U.S. Pat. No. 3,402,782 issued in the name of G. Ljungstrom shows one type of cushioned engine mount. The present invention is directed to mechanism for releasably connecting the engine to the cushion pad so that the engine can be hoisted or lifted out of the vehicle for maintenance purposes and later lowered to its mounted position. One object of the invention is to provide a clamp type connection between the engine and the cushion pad. A particular objective is to provide a very secure clamp that will not work loose under vibrational loads produced thereon by the engine. Another aim of the invention is to provide a clamp that has adjustability features which permit a degree of misalignment between the engine and pad, as for example might occur during normal manufacturing operations or when an engine is replaced with a different engine.

The invention described herein may be manufactured, used, and licensed by or for the Government for governmental purposes without payment to me of any royalty thereon.

THE DRAWINGS

Figure 1:
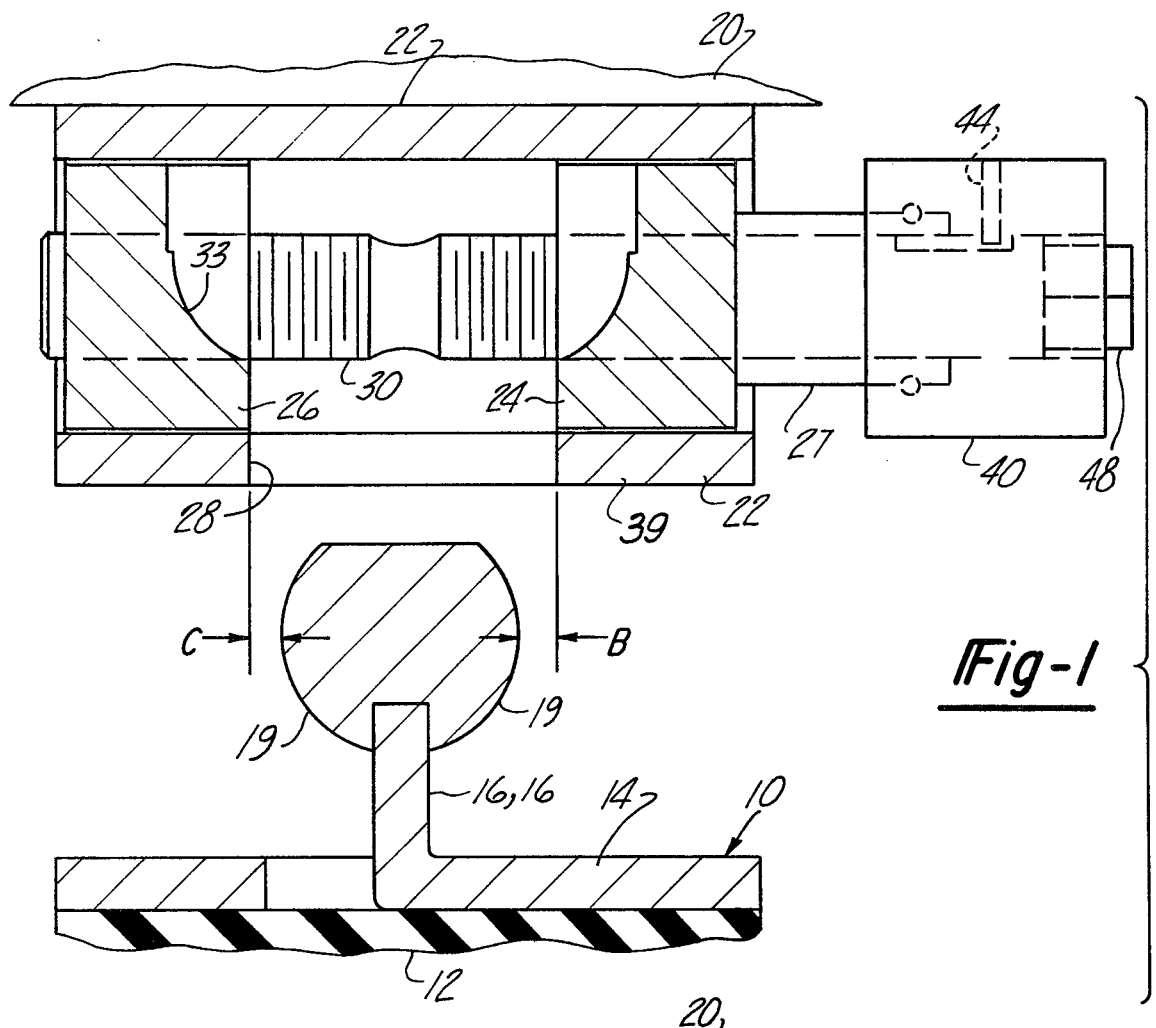
FIG. 1 is an exploded view of an engine mount incorporating this invention.

FIG. 1 illustrates a vehicle-attached base 10 that comprises a resilient elastomeric pad 12 suitably bonded or otherwise connected to a non-illustrated portion of the vehicle. Base 10 also comprises a metal plate 14 having two upstanding struts 16, each of which is connected to a rod-like hold-down element 18. The individual struts and hold-down elements are laterally spaced as shown in FIG. 5.

Figure 2:
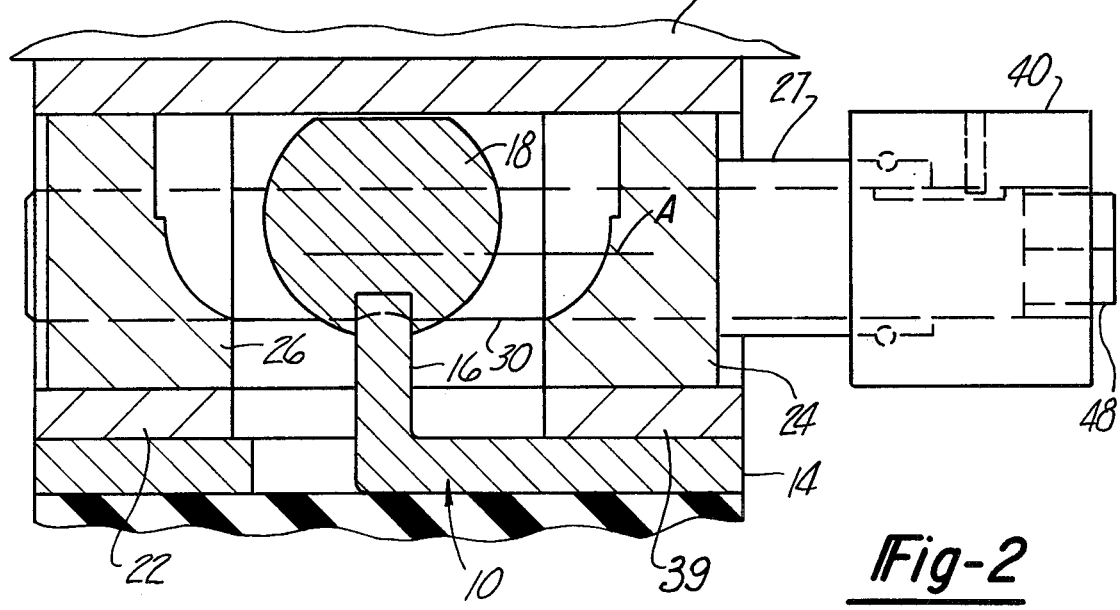
FIG. 2 shows the FIG. 1 mount as it would appear after the engine is lowered into the vehicle.
Figure 3:
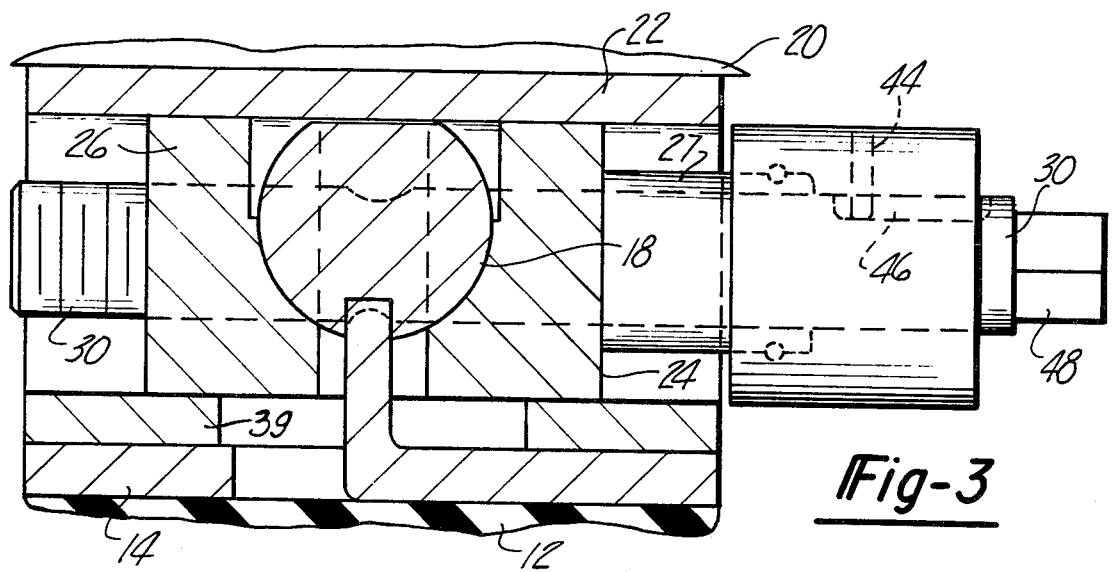
FIG. 3 illustrates the FIG. 2 mechanism in the clamped position.
Figure 5:
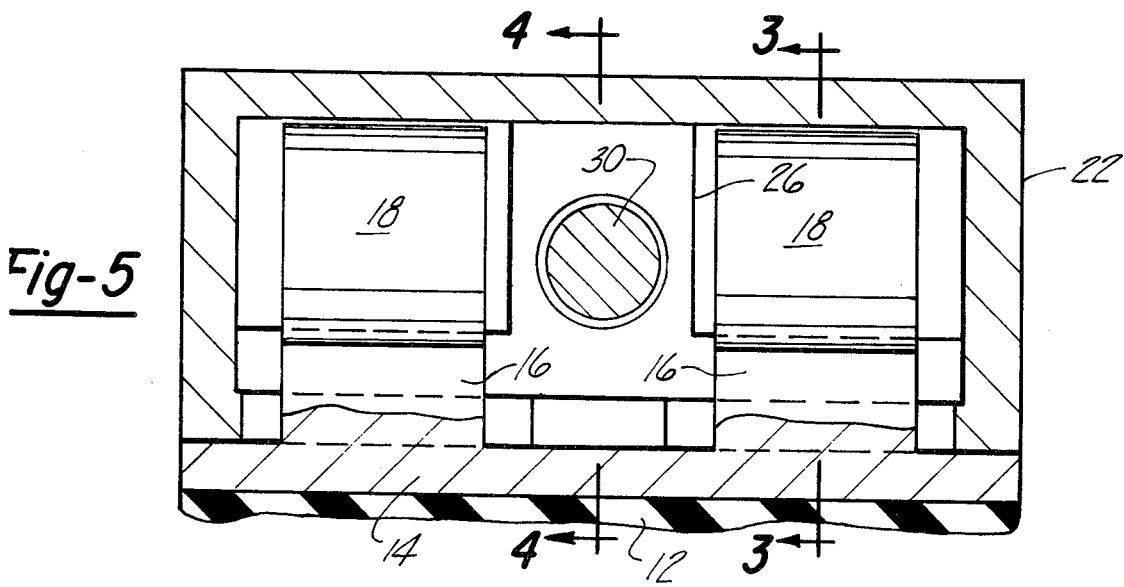
FIG. 5 is a sectional view taken on line 5—5 in FIG. 4.

The vehicle engine, fragmentarily shown at 20, carries a tubular rail 22 of rectangular cross section (see FIG. 5). FIG. 1 shows the engine in an elevated position detached from the vehicle, whereas FIG. 2 illustrates the same engine lowered into the vehicle so that tubular rail 22 rests on plate portion 14 of base 10. In the FIG. 2 position the engine is still unclamped from base 10; FIG. 3 illustrates the mechanisms after the engine is clamped in place on the pad. It will be understood that the drawings show only one of a multiple number of engine mounts; the total engine is supported by a number of such engine mounts located at different points on the undersurface of the engine.

The engine-attached rail 22 slidably contains two spaced-apart jaws 24 and 26. In the position of FIG. 1 the jaws are spaced apart so that when the engine is lowered toward base 10 the hold-down elements 18 will project through openings 28 in the lower wall of rail 22, thereby causing the hold-down elements to assume centralized positions in the rail as shown in FIG. 2. Thereafter the jaws 24 and 26 are moved toward one another to the FIG. 3 position clamped against the undersurfaces of elements 18; the engine is thus connected in a secure fashion to the vehicle.

Figure 6:
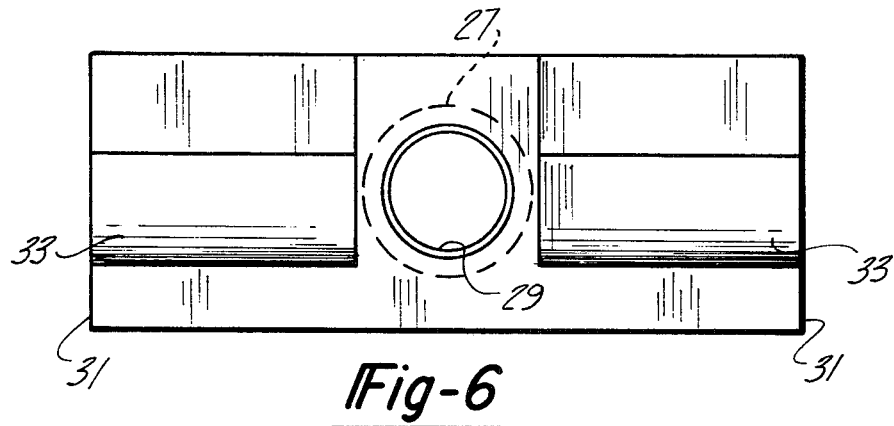
FIGS. 6, 7 and 8 are views of a block-like jaw structure used in the mechanism of FIGS. 1 through 5.
Figure 7:
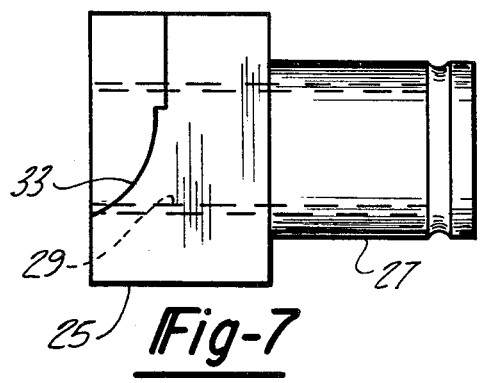
Figure 8:
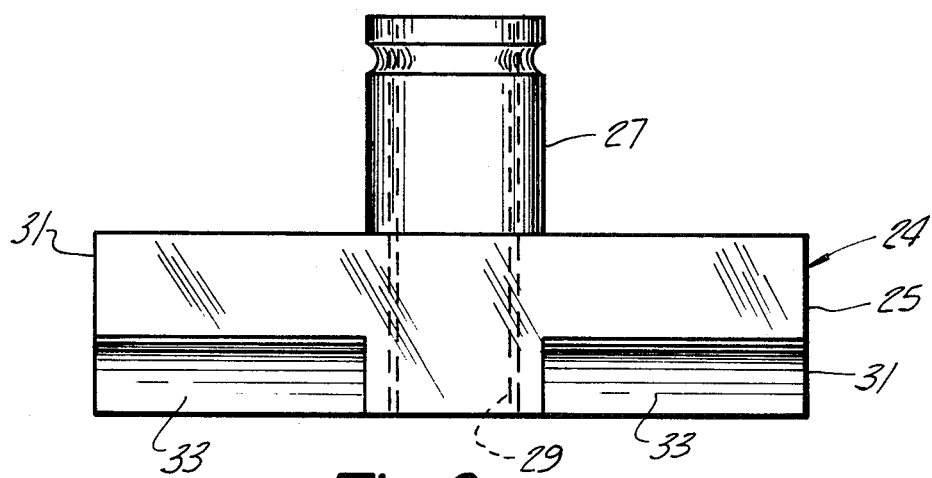

Referring for the moment to FIGS. 6 through 8, there is shown a jaw 24 having a block-like main section 25 and a tubular extension 27. A threaded bore 29 extends through the jaw midway between the jaw side edges 31. The front side faces of the jaw section 24 are cut out as at 33 to form clamp surfaces contoured to mate with the side surfaces of hold-down elements 18 (FIGS. 2 and 3). The other jaw 26 (FIG. 2) is similar to jaw 24 except that it has no tubular extension corresponding to extension 27.

Jaws 24 and 26 are dimensioned to slidably fit in tube 22 so that threaded bores 29 are aligned on the tube 22 axis. Cooperating screw 30 has lefthand threads engaged with block 26 and righthand threads engaged with block 24. The right end of the screw is at least partly exposed for connection to a wrench or similar turning implement, whereby rotation of the screw causes the jaws 24 and 26 to simultaneously move from the FIG. 2 unclamped position to the FIG. 3 clamped position engaged against opposite side surfaces of hold-down elements 18. Simultaneous movement of the jaws toward one another is made possible because the threads in the respective screw sections are of different hand. A similar result could be achieved by making the meshed threads in the screw and respective jaws of different pitch and same hand; the jaws would move toward or away from each other by differential pitch action.

Curved undersurfaces 19 of the hold-down elements 18 are acutely angled to the axis A of tubular rail 22; accordingly, as the cylindrically contoured surface 33 of each jaw 24 or 26 engages the respective curved surface 19 the respective jaw tends to cam downwardly against the floor wall 39 of the tubular rail. The rail is thereby urged tightly against the upper surface of base plate 14. Clamping action exists between wall 39 and base plate 14.

When the jaws 24 and 26 and screw 30 are in the FIG. 2 unclamped positions they are freely adjustable as a unit back and forth within tube 22. Therefore the jaws do not have to be exactly centered relative to hold-down elements 18. If one jaw should reach element 18 before the other jaw the first jaw will merely abut against element 18 until the other jaw reaches element 18. This is advantageous in that the jaws automatically shift to apply equal pressures on the hold-down elements, thereby providing a secure clamp action. The shifting-centering capability of the jaw assembly is also useful in that the engine does not have to be lowered to a precise position on cushion base plate 14. For example, as seen in FIG. 1, the tubular rail 22 has adjustment latitude referenced by numerals B and C (the size difference between element 18 and openings 28). Adjustment capability compensates for such factors as tolerances on the location of rail 22, and variation in the path taken by the rail during the engine-lower operation.

It will be noted that jaws 24 and 26 are completely concealed within rail 22. Therefore, it is not possible to visually check whether the jaws are clamped or unclamped on the hold-down elements 18. Of course, if the screw 30 is turned in the proper direction the jaws 24 and 26 will automatically clamp against the hold-down elements 18. The structure shown in the drawings includes means for insuring that the technician will turn screw 30 in the proper direction to ensure a securely clamped engine. The sought-for insurance is provided by a tubular shield 40 carried jointly by jaw 24 and screw 30.

Figure 4:
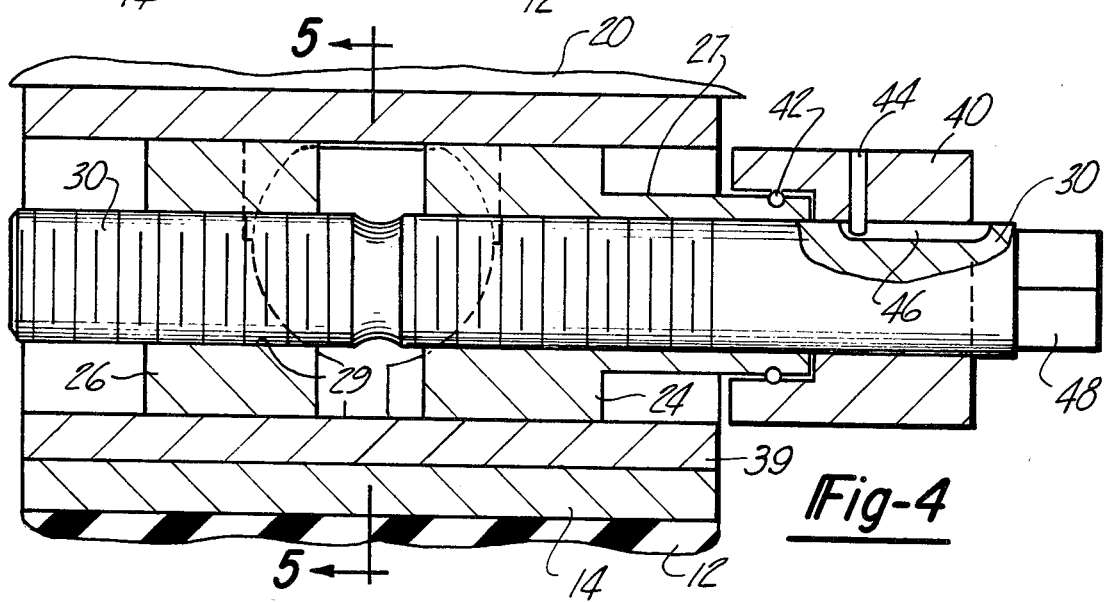
FIG. 4 illustrates the mechanism of FIG. 3 taken on line 4—4 in FIG. 5.

In the drawing, particularly FIG. 4, tubular shield 40 is shown as having a rotary anti-friction swivel connection 42 with the extension 27 for jaw 24. The tubular shield 40 is keyed to screw 30 by means of a pin 44 and keyway 46. In the unclamped position of FIG. 2 shield 40 obstructs access to the square cross section actuator end 48 of screw 30. This requires the technician to start the screw turning toward a clamped condition by hand manipulation of the surrounding shield 40. As the screw turns to move jaws 24 and 26 to the FIG. 3 clamped position the tubular shield 40 is drawn to the left with jaw 24, to thereby expose actuator end 48. Final tightening of the clamp (or initial untorquing) is made by wrench pressure on actuator section 48. Shield 40 informs the technician of the status of jaws 24 and 26. When shield 40 overlies actuator 48 the jaws are open (unclamped); when actuator 48 is in view the jaws are closed. The shield forces the technician to turn the screw in the proper direction during wrench application because if the screw is turned in the wrong direction the shield 40 will force the wrench off of actuator 48.

Figure 10:
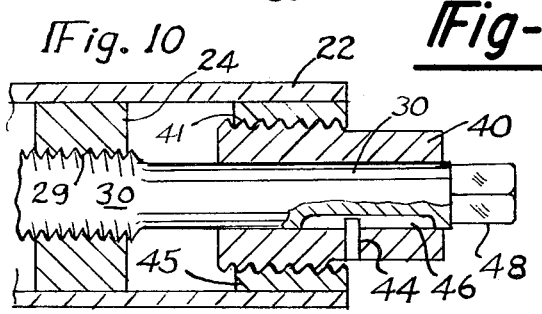
FIGS. 9 and 10 illustrate a further invention structure.
Figure 9:
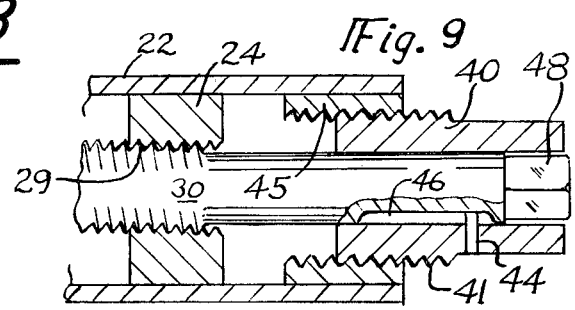

FIGS. 9 and 10 illustrate an alternative mechanism for insuring correct rotation of screw 30 to produce clamping (or unclamping) movement of jaws 24 and 26. FIG. 9 shows a tubular shield 40 overlying the actuator end 48 of screw 30. FIG. 10 shows the position of shield 40 after the shield has been rotated to expose the actuator section 48 of screw 30. In the FIG. 9 position of shield 40 the jaw 24 is unclamped from the hold-down element 18 (not shown), whereas in the FIG. 10 position of shield 40 the jaw 24 is advanced toward a clamped condition against element 18 (not shown). Final tightening of the jaw 24 (and companion jaw 26) is accomplished by wrench action on actuator section 48.

Shield 40 is keyed to screw 30 by means of a pin 44, extending into a keyway 46. The shield is provided with relatively coarse external threads 41 that mesh with internal threads on a sleeve-like insert 45 in tubular rail 22. Jaw 24 is provided with relatively fine internal threads 29 engaged with external threads on screw 30. When a manual rotational force is applied to shield 40 the shield threads into insert 45; pin 44 causes screw 30 to rotate with shield 40, thereby threading jaw 24 leftwardly along said screw 30. The shield will screw into rail 22 as jaw 24 proceeds from the FIG. 9 position to the FIG. 10 position. Final tightening of jaw 24 against the aforementioned rod element 18 is achieved by wrench action on the exposed actuator 48. The general mode of operation is similar to that of the structure shown in FIG. 4.

I wish it to be understood that I do not desire to be limited to the exact details of construction shown and described for obvious modifications will occur to a person skilled in the art.

I claim:

1. An engine mount comprising a vehicle-attached base; an engine-attached hollow rail adapted to rest on the base; said base having an engine hold-down element adapted to project through an opening in a lower surface of the rail so that said element assumes a centralized position in the rail interior; two spaced-apart jaws slidably positioned within the rail at opposite sides of the hold-down element; and a screw threaded through said jaws for moving same into clamped positions against opposite side surfaces of the hold-down element; the screw threads engaged with one jaw being right-handed, and the screw threads engaged with the other jaw being left-handed, whereby the jaws move simultaneously toward the hold-down element; the jaws and screw being freely adjustable as a unit on the rail, whereby the jaws apply equal pressures on the hold-down element; said screw having an actuator end located outside the hollow rail; one of said jaws having a tubular shield surrounding the screw actuator end to obstruct access thereto when the jaws are spread apart to a maximum permissible distance.

2. The engine mount of claim 1 wherein the tubular shield is keyed to the screw for axial movement therealong; said shield being rotatably swivelled on said one jaw for free movement therearound, whereby the shield can be manually turned to rotate the screw and simultaneously advance the shield along the screw surface in accordance with the resultant travel of the connected jaw; said shield being oriented on the screw so as to substantially conceal the actuator end when the jaws are spread apart a maximum permissible distance, whereby initial movement of the screw must be accomplished by manual manipulation of the shield.

3. The engine mount of claim 1 wherein the tubular shield is keyed to the screw for axial movement therealong; said shield being threadably connected to the rail so that the shield can be manually turned to rotate the screw and simultaneously advance the shield along the screw surface; said shield being oriented on the screw so that the shield substantially conceals the actuator end of the screw when the jaws are spread apart a maximum permissible distance, whereby initial movement of the screw may be accomplished by manual manipulation of the shield.

* * * * *